United States Patent
Brehin et al.

(10) Patent No.: US 7,764,198 B2
(45) Date of Patent: Jul. 27, 2010

(54) AIRCRAFT STANDBY DISPLAY DEVICE

(75) Inventors: Didier Brehin, Toulouse (FR); Stephane Dattler, Montlaur (FR)

(73) Assignee: Airbus France, Toulouse (FR)

( * ) Notice: Subject to any disclaimer, the term of this patent is extended or adjusted under 35 U.S.C. 154(b) by 786 days.

(21) Appl. No.: 11/573,437

(22) PCT Filed: Jul. 27, 2005

(86) PCT No.: PCT/FR2005/001949

§ 371 (c)(1),
(2), (4) Date: Feb. 8, 2007

(87) PCT Pub. No.: WO2006/024744

PCT Pub. Date: Mar. 9, 2006

(65) Prior Publication Data

US 2009/0224945 A1    Sep. 10, 2009

(30) Foreign Application Priority Data

Aug. 9, 2004    (FR) .................................. 04 08746

(51) Int. Cl.
G01C 23/00 (2006.01)
G01C 21/00 (2006.01)
G08B 21/00 (2006.01)

(52) U.S. Cl. ........................ 340/973; 340/979; 340/945; 340/975; 340/980; 701/3; 701/9; 701/14

(58) Field of Classification Search ........................ None
See application file for complete search history.

(56) References Cited

U.S. PATENT DOCUMENTS

| 4,598,292 | A | 7/1986 | Devino |
| 6,112,141 | A | 8/2000 | Briffe et al. |
| 6,812,858 | B2 * | 11/2004 | Griffin, III ................... 340/945 |
| 6,836,725 | B2 * | 12/2004 | Millington et al. .......... 701/206 |
| 6,842,672 | B1 * | 1/2005 | Straub et al. .................... 701/3 |
| 6,853,315 | B2 * | 2/2005 | Schiller et al. .............. 340/974 |
| 7,382,288 | B1 * | 6/2008 | Wilson et al. ............... 340/972 |
| 2003/0030911 | A1 | 2/2003 | Brooks |
| 2004/0236481 | A1 * | 11/2004 | Saint-Aroman et al. ........ 701/3 |
| 2007/0008188 | A1 * | 1/2007 | Firra .......................... 340/973 |

FOREIGN PATENT DOCUMENTS

GB    2249417    5/1992

OTHER PUBLICATIONS

International Search Report dated Jan. 17, 2006.

* cited by examiner

*Primary Examiner*—Daniel Wu
*Assistant Examiner*—Fekadeselassie Girma
(74) *Attorney, Agent, or Firm*—Dickinson Wright PLLC

(57) ABSTRACT

An aircraft standby display device includes a set of data sources, a data processing unit, and a display. The display presents altitude control indicators representing speed, altitude, attitude, and a heading scale that includes a characteristic symbol indicating a next route point of an aircraft flight plan. The heading scale is independent of the altitude control indicators. The display also presents a quantitative value that: (1) indicates the remaining distance of flight of the aircraft to reach the next route point and (2) is associated with the characteristic symbol.

6 Claims, 2 Drawing Sheets

US 7,764,198 B2

AIRCRAFT STANDBY DISPLAY DEVICE

FIELD OF THE INVENTION

The present invention relates to an aircraft standby display device, in particular for a civil transport airplane.

BACKGROUND OF THE RELATED ART

Such a standby display device must make it possible to display, in the flight deck of the aircraft, minimum information [piloting information (speed, altitude, attitude) and navigation information] which is representative of the flight of the aircraft, in case of failure of a main display device of the aircraft, in particular a navigation screen of "ND" type ("Navigation Display") or a primary piloting screen of "PFD" type ("Primary Flight Display"), or in case of failure of a system [ADIRS ("Air Data and Inertial Reference System"), FMS ("Flight Management System"), . . . ] formulating information customarily displayed on said main display devices of the aircraft (ND, PFD, . . . ).

There is known a first standby display device of the "ISIS" type (Integrated Standby Instrument System) which displays piloting information (altitude, speed and attitude) of the aircraft on a screen, whose man/machine interface resembles that of the PFD screen. Document FR-2 784 457 relates to such a first standby display device.

There is also known a second standby display device of the "DDRMI" type ("Digital Distance and Radio Magnetic Indicator") which displays navigation information, such as the heading of the aircraft, as well as its position with respect to standard beacons, for example of "VOR" type (VHF Omnidirectional Range") or of "DME" type ("Distance Measuring Equipment").

These two standby display devices ISIS and DDRMI therefore display very different information.

However, neither of these devices ISIS and DDRMI is able, on its own, to display the aforesaid minimum piloting and navigation information. Moreover, even when an aircraft simultaneously comprises both these devices ISIS and DDRMI, there are still significant drawbacks in the standby display. Specifically, when the ISIS device has failed or is not available, the aircraft cannot take off for safety reasons, since the display of some information would not then be guaranteed in case of failure of the main display devices (PDF, ND, . . . ) during the flight. Furthermore, the DDRMI device does not cover the geographical zones where no VOR signal or DME signal exists (oceanographic zones, terrestrial zones poorly equipped with VOR or DME stations).

Moreover, document US 2002/0123830 discloses a particular primary piloting screen which, in addition to the information displayed customarily on a PFD screen (speed, altitude, attitude), also presents a heading scale on the horizon line, on which are displayed a first symbol representing the route followed by the aircraft and a second symbol representing the route to be followed so as to fly towards the next route point. This known screen cannot therefore be used as standby display device, since it does not display the minimum navigation information necessary, in particular it does not make it possible to ascertain the exact position of the next route point. Moreover, as the heading scale is situated directly on the horizon line, reading the information is rendered difficult.

SUMMARY OF THE INVENTION

The subject of the present invention is a standby display device which makes it possible to remedy the aforesaid drawbacks.

For this purpose, according to the invention, said standby display device of the type comprising:
 a set of information sources;
 an information processing unit capable of processing information emanating from said set of information sources; and
 a display means which is capable of presenting on at least one visualization screen processed information emanating from said information processing unit and which is formed in such a way as to present on said visualization screen:
  piloting indicators illustrating at least information concerning speed, altitude and attitude of the aircraft; and
  a heading scale comprising a first characteristic sign illustrating the heading of at least one next route point of a flight plan of the aircraft, is noteworthy in that said heading scale is independent of said piloting indicators on said visualization screen, and in that said misplay means moreover presents on said visualization screen a quantitative value which illustrates the distance remaining to be traveled by the aircraft to reach said next route point and which is associated with said first characteristic sign.

Thus, by virtue of the invention, one ascertains at one and the same time the heading and the distance of the next route point, thereby making it possible to exactly ascertain this route point. Minimum navigation information necessary for the flight is thus available. The standby display device in accordance with the invention therefore displays all the essential information which is representative of a flight of the aircraft, that is to say the piloting information (speed, altitude, attitude) and also the navigation information (route point).

Moreover, this piloting and navigation information is displayed simultaneously on the visualization screen, the standby display device in accordance with the invention then being able to deputize simultaneously for at least one navigation screen and/or at least one piloting screen, as well as a second standby display device in accordance with the invention, which are all faulty. By way of example, the standby display device in accordance with the invention may therefore effectively replace said standard ISIS and DDRMI devices and, thus, remedy the aforesaid drawbacks. Moreover, it is capable of covering all the zones of the terrestrial globe.

Furthermore, as the heading scale is independent of said piloting indicators, the reading and the assimilation of the various information presented are clarified and facilitated.

In a preferred embodiment, said display means presents said quantitative value in numerical form on said visualization screen, and does so in proximity to said heading scale.

Furthermore, advantageously, said display means moreover presents on said heading scale a second characteristic sign illustrating the current heading of the aircraft. Consequently, the pilot need merely pilot the aircraft in such a way as to substantially superimpose said second characteristic sign representative of the current heading (or route) of the aircraft with said first characteristic sign representative of the heading of the next route point, to direct the aircraft towards this next route point. Thus, the pilot has a simple and effective piloting aid.

Moreover, in a particular embodiment:
 said display means is formed so as to present said first characteristic sign in proximity to the end of said heading scale corresponding to the side of this heading scale where said next route point is to be found, when the latter is situated outside said heading scale such as presented on said visualization screen; and/or said display means moreover presents, in proximity to said heading scale, a numerical value which indicates the heading of said next route point, when the latter is situated outside said heading scale such as presented on said visualization screen.

By virtue of this latter embodiment, the pilot always knows the next route point (navigation information), even if the latter is situated outside said heading scale presented on said visualization screen and cannot therefore be indicated on this heading scale.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
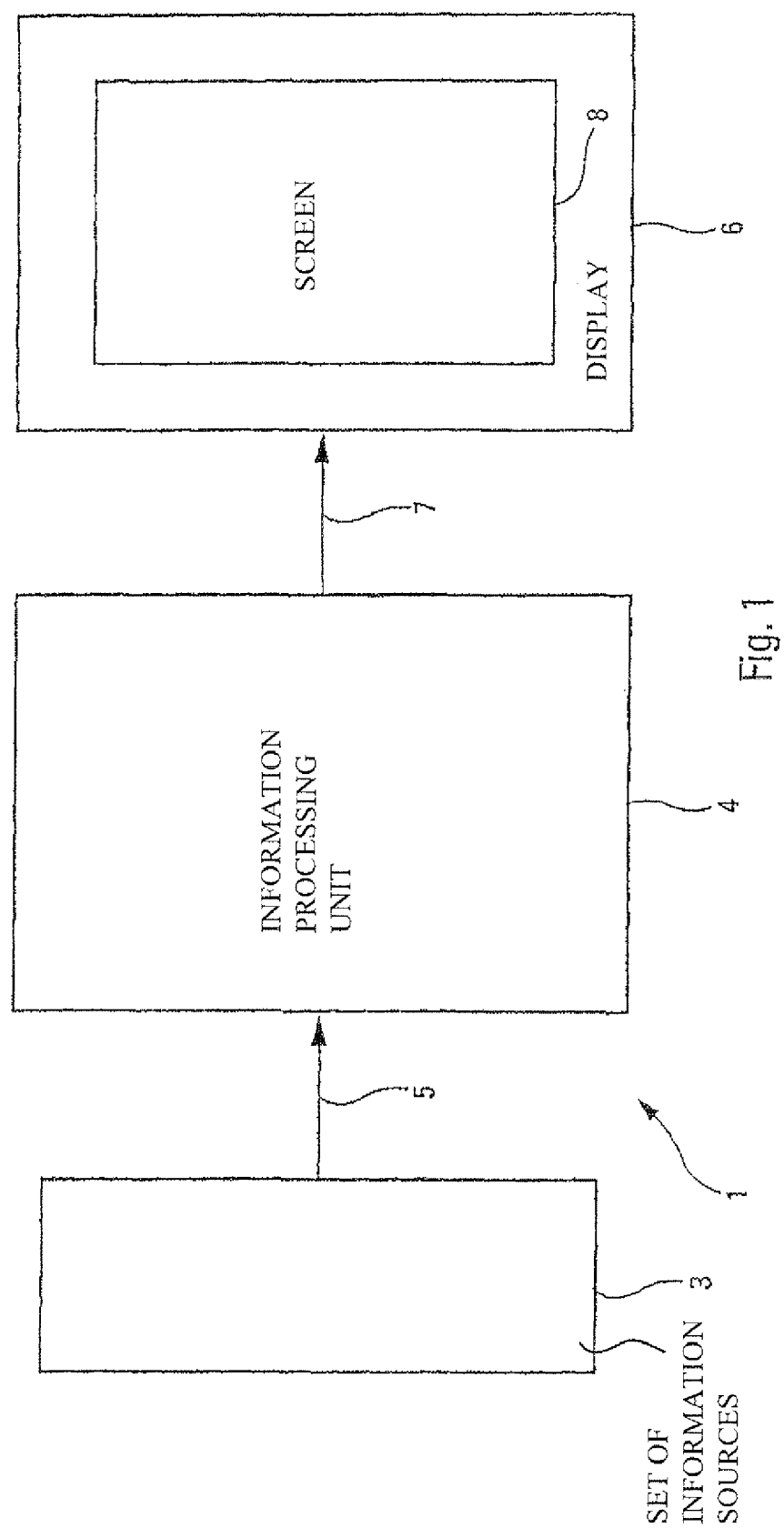
FIG. 1 is the schematic diagram of a standby display device in accordance with the invention.

The device 1 in accordance with the invention is a standby display device of an aircraft, in particular of a civil transport airplane, and may for example be used to deputize for a standard main display device, in particular a PFD device or an ND device, in case of failure of the latter.

Said standby display device 1, which is carried on board the aircraft, is of the type comprising:
- a set 3 of information sources;
- an information processing (central) unit 4 which is connected by a link 5 to said set 3 of information sources and which is capable of processing information emanating from said set 3 of information sources; and
- a display means 6 which is connected by a link 7 to said information processing unit 4 and which is capable of presenting, on at least one standard visualization screen 8, processed information emanating from said information processing unit 4.

Figure 3:
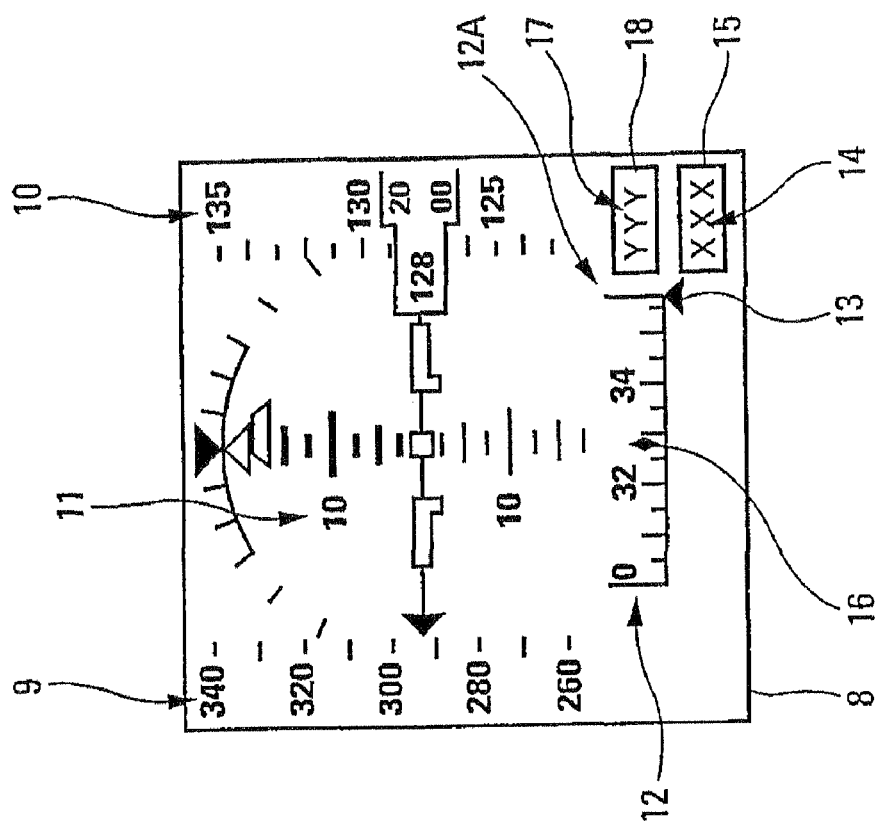
FIGS. 2 and 3 show the display effected on a visualization screen of a standby display device in accordance with the invention, respectively in two different situations.
Figure 2:
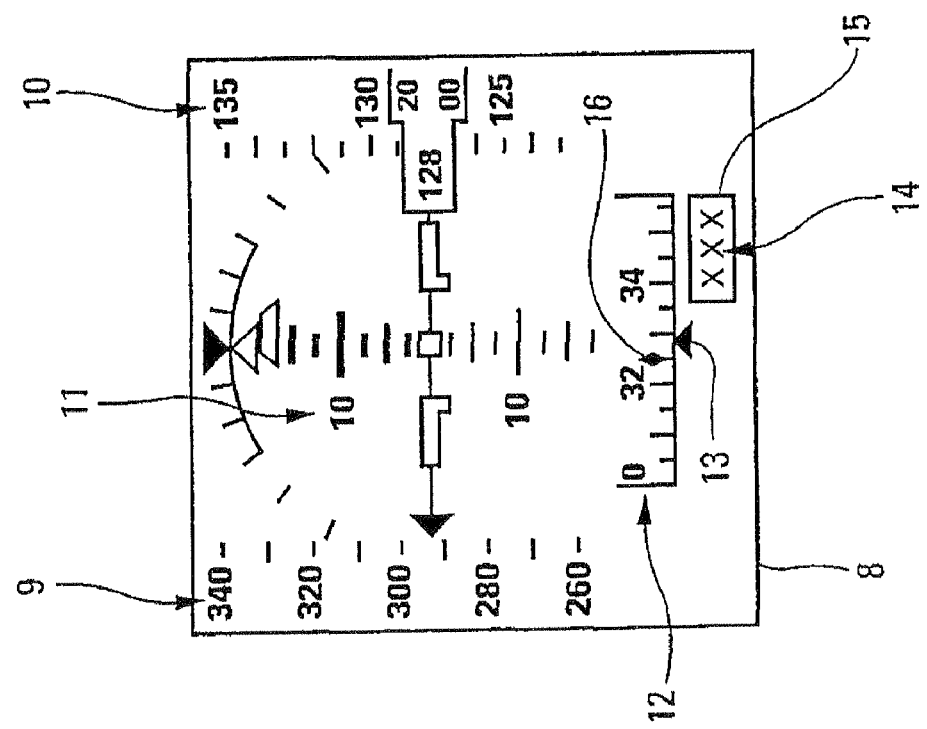

Moreover, said display means 6 is formed in such a way as to present on said visualization screen 8, as represented in FIGS. 2 and 3:
- standard piloting indicators 9, 10 and 11, namely a speed indicator 9, an altitude indicator 10 and an attitude indicator 11, illustrating respectively information concerning speed, altitude and attitude of the aircraft, received from said central unit 4; and
- a heading scale 12 comprising a characteristic sign 13 illustrating the heading (also received from said central unit 4) of at least one next standard route point of a flight plan of the aircraft.

According to the invention, said heading scale 12 is independent of said piloting indicators 9, 10 and 11 on said visualization screen 8, that is to say it is not displayed on said piloting indicators 9, 10 and 11, and said display means 6 presents, moreover, on said visualization screen 8 a quantitative value 14 (XXX) which illustrates the remaining distance to be traveled by the aircraft to reach said next route point and which is associated with said characteristic sign 13 (represented for example in the form of a pink arrow).

Thus, by virtue of the device 1 in accordance with the invention, the pilot knows at any moment at one and the same time the heading (characteristic sign 13 on the scale 12) and the distance (quantitative value 14) of the next route point of the flight plan followed by the aircraft, thereby making it possible to exactly ascertain said route point. Navigation information is thus available to the pilot. Said standby display device 1 therefore displays the essential information, which is representative of the flight of the aircraft, that is to say the piloting information (speed, altitude, attitude) and also the navigation information (route point).

Moreover, this piloting and navigation information is displayed simultaneously on the visualization screen 8, the standby display device 1 in accordance with the invention then being able to deputize simultaneously for at least a navigation screen and/or at least a piloting screen, which are faulty.

Furthermore, as the heading scale 12 is independent of said piloting indicators 9, 10 and 11, the reading and assimilation of the various information presented are clarified and facilitated for the pilot, the piloting information and the navigation information being separate although represented on the same visualization screen 8.

In a preferred embodiment, said display means 6 presents said quantitative value 14 in numerical form inside a window 15 which is preferably displayed in proximity to said heading scale 12 (for example just below, above or to the side of the latter), as represented in FIG. 2.

Furthermore, said display means 6 moreover presents, on said heading scale 12, a characteristic sign 16 (for example a green diamond) illustrating the current heading of the aircraft. Consequently, the pilot merely needs to pilot the aircraft in such a way as to bring said characteristic sign 16 representative of the current heading (or of the current route) of the aircraft onto said characteristic sign 13 representative of the heading (or of the route) of the next route point, to direct the aircraft towards this next route point. The pilot thus has a simple and effective piloting aid.

Moreover, in a particular embodiment represented in FIG. 3 which is applied to the case where the next route point is situated outside the heading scale part which is presented on the visualization screen 8:
- said display means 6 presents said characteristic sign 13 (or a specific characteristic sign, not represented) in proximity to the end 12A of said heading scale 12 corresponding to the side of this heading scale 12 where said next route point is to be found (that is to say on the right side for the example of FIG. 3). By way of example, the characteristic sign 13 may be displayed directly on the end 12A as shown in FIG. 3, or slightly outside the heading scale 12 in immediate proximity to this end 12A; and
- said display means 6 moreover presents, in proximity to said heading scale 12, a quantitative value 17 (YYY) which indicates the heading of said next route point and which is for example displayed in numerical form in a window 18.

By virtue of this latter embodiment, the pilot always knows the heading (quantitative value 17) and the distance (quantitative value 14) of the next route point (navigation information), even if the latter is situated outside the heading scale part 12 (corresponding for example to 50°) which is presented on said visualization screen 8.

The invention claimed is:

1. An aircraft standby display device comprising:
   a set of information sources;
   an information processing unit that processes information emanating from said set of information sources;
   a display that presents, on at least one visualization screen, processed information emanating from said information processing unit and which is formed in such a way as to present on said visualization screen:

piloting indicators illustrating at least information concerning speed, altitude, and attitude of the aircraft;

a heading scale comprising a first characteristic sign illustrating the heading of at least one next route point of a flight plan of the aircraft, said heading scale being independent of said piloting indicators on said visualization screen; and a quantitative value which illustrates the distance remaining to be traveled by the aircraft to reach said next route point and which is associated with said first characteristic sign; and a determining device that determines a case where the next route point is situated outside the heading scale part which is presented on the visualization screen, wherein said display presents said first characteristic sign in proximity to the end of said heading scale corresponding to the side of this heading scale where said next route point is to be found, when the latter is situated outside said heading scale such as presented on said visualization screen.

2. The aircraft standby display device as claimed in claim 1, wherein:

said information processing unit provides the current heading of the aircraft, and said display moreover presents on said heading scale a second characteristic sign illustrating said current heading of the aircraft.

3. An aircraft standby display device comprising:

a set of information sources;

an information processing unit that processes information emanating from said set of information sources;

a display that presents, on at least one visualization screen, processed information emanating from said information processing unit and which is formed in such a way as to present on said visualization screen:

piloting indicators illustrating at least information concerning speed, altitude, and attitude of the aircraft;

a heading scale comprising a first characteristic sign illustrating the heading of at least one next route point of a flight plan of the aircraft, said heading scale being independent of said piloting indicators on said visualization screen; and a quantitative value which illustrates the distance remaining to be traveled by the aircraft to reach said next route point and which is associated with said first characteristic sign; and a determining device that determines a case where the next route point is situated outside the heading scale part which is presented on the visualization screen, wherein said display moreover presents, in proximity to said heading scale, a numerical value which indicates the heading of said next route point, when the latter is situated outside said heading scale such as presented on said visualization screen.

4. The aircraft standby display device as claimed in claim 3, wherein:

said information processing unit provides the current heading of the aircraft, and said display moreover presents on said heading scale a second characteristic sign illustrating said current heading of the aircraft.

5. An aircraft comprising an aircraft standby display device, said aircraft standby display device comprising:

a set of information sources;

an information processing unit that processes information emanating from said set of information sources;

a display that presents, on at least one visualization screen, processed information emanating from said information processing unit and which is formed in such a way as to present on said visualization screen:

piloting indicators illustrating at least information concerning speed, altitude, and attitude of the aircraft;

a heading scale comprising a first characteristic sign illustrating the heading of at least one next route point of a flight plan of the aircraft, said heading scale being independent of said piloting indicators on said visualization screen; and a quantitative value which illustrates the distance remaining to be traveled by the aircraft to reach said next route point and which is associated with said first characteristic sign; and a determining device that determines a case where the next route point is situated outside the heading scale part which is presented on the visualization screen, wherein said display presents said first characteristic sign in proximity to the end of said heading scale corresponding to the side of this heading scale where said next route point is to be found, when the latter is situated outside said heading scale such as presented on said visualization screen.

6. An aircraft comprising an aircraft standby display device, said aircraft standby display device comprising:

a set of information sources;

an information processing unit that processes information emanating from said set of information sources;

a display that presents, on at least one visualization screen, processed information emanating from said information processing unit and which is formed in such a way as to present on said visualization screen:

piloting indicators illustrating at least information concerning speed, altitude, and attitude of the aircraft;

a heading scale comprising a first characteristic sign illustrating the heading of at least one next route point of a flight plan of the aircraft, said heading scale being independent of said piloting indicators on said visualization screen; and a quantitative value which illustrates the distance remaining to be traveled by the aircraft to reach said next route point and which is associated with said first characteristic sign; and a determining device that determines a case where the next route point is situated outside the heading scale part which is presented on the visualization screen, wherein said display moreover presents, in proximity to said heading scale, a numerical value which indicates the heading of said next route point, when the latter is situated outside said heading scale such as presented on said visualization screen.

* * * * *